April 7, 1942.                J. F. CYPHERS ET AL                2,278,647
                    CONTINUOUS SOLVENT EXTRACTION APPARATUS
                        Filed March 10, 1938          5 Sheets-Sheet 5

INVENTOR
James F. Cyphers
George Scheu
BY Wallace T. Jones
ATTORNEY

Patented Apr. 7, 1942

2,278,647

UNITED STATES PATENT OFFICE 2,278,647

CONTINUOUS SOLVENT EXTRACTION APPARATUS

James F. Cyphers, Maplewood, N. J., and George Scheu and Wallace T. Jones, Brooklyn, N. Y., assignors to Rockwood & Co., Brooklyn, N. Y., a corporation of Delaware Application March 10, 1938, Serial No. 195,040

1 Claim. (Cl. 260—412.4)

This invention relates to a process and apparatus for the solvent extraction of materials and more particularly to a process and apparatus for the continuous extraction of fatty material from oil bearing cellular material by the use of a volatile solvent. The extraction of cocoa butter from cocoa beans has been accomplished heretofore by a hot pressing operation which removes most of the oil but which leaves a solid cake as a residue, known as "press cake" still containing from about 8–12% of cocoa butter.

One object of our invention is to provide a continuous process and apparatus for extracting fatty material from fat or oil bearing material such as seeds or nuts by means of a solvent.

It is a further object of this invention to provide a process and apparatus for the continuous counter-current solvent extraction of fatty material from solid material and the recovery of the solvent for re-use.

Another object of the invention is to provide a process and apparatus for extraction of fat or oil with a volatile solvent using a closed system which prevents any substantial loss of solvent.

Other objects and advantages will be apparent from the following description of one embodiment of the invention taken in conjunction with the accompanying drawings, in which—

The invention will be described as applied to the extraction of residual cocoa butter from what is known in the chocolate industry as "press cake" and which is the solid residue obtained by subjecting ground cocoa beans to a filtering and pressing operation at an elevated temperature. This press cake as it is removed from the filter press is a hard cake, dry to the touch, and relatively brittle. The press cake is first crushed in any suitable form of crusher (not shown) and the crushed press cake is then preferably subjected to a classification operation to separate the press cake particles of suitable size to be treated by the solvent from the remaining particles. The particles of press cake which are greater in size than about ½ inch are preferably returned to the crusher. Particles of press cake smaller than about $\frac{1}{16}$ inch in size, that is the fines and powder, are rejected and may be used for other purposes, such as the manufacture of cocoa. Lumps of material may be employed up to 1 inch in size depending on the porosity of the lumps, the time during which they are in contact with solvent, and other factors, but for the treatment of press cake we prefer to employ particles not larger than ½ inch.

Referring to the drawings, the sifted and classified particles, ranging from about $\frac{1}{16}$ to about ½ inch in size, are carried from the classifier 10, by means of a worm or other form of conveyor in the conduit 11, to the top of the feed tube 12 and dropped down through the tube 12 under the influence of gravity. The powder and fine particles rejected by the classifier may be carried away by the conduit 10a. The feed tube 12 is preferably maintained substantially full of particles to be treated at all times. The lower end of the feed tube 12 is connected at an acute angle to the silo or extraction tower 13 just below its top, so that the particles are fed from the tube 12 into the silo 13 by gravity. The silo 13 is preferably of relatively great height in comparison to its diameter and the particles pass down through this extraction tower by gravity. The lower portion of the silo 13 is preferably provided with a conical shaped interior 13a so that the solid matter will move by gravity through the conduit 14 to the bottom of the jacket 15 surrounding the endless conveyor 16. Conveyor 16 is preferably completely enclosed by the jacket 15 which is provided with separate vertical sections for each side of the conveyor 16. The casing 15 preferably extends to a height above the top of the silo 13, or at least to a point well above the inlet 12 to the silo 13.

During the passage of the press cake particles down through the silo 13 and up through the conveyor casing 15, they are subjected to a counterflow of solvent, as will be hereinafter described. The size of the particles is preferably adjusted as described in connection with the classifier 10 to obtain complete extraction of the fat without clogging the system. If the particles are too large for the length of the silo and the speed of travel, complete extraction will not be obtained. On the other hand, too large a proportion of particles substantially smaller than $\frac{1}{16}$ inch may result in clogging the gravity feed. The endless conveyor 16 is preferably a conveyor which is capable of elevating solid material through a closed passageway by forming an arch of the material and automatically dumping the solid material as soon as an opening in the passageway is reached which breaks the arch. Other forms of endless conveyors or other conveyors may be employed. As the solid material which has been treated with solvent reaches the opening in casing 15 at the top of the chute 17, it is released by the conveyor 16 and falls by gravity down the chute 17 and is carried to driers by a worm or other form of conveyor in the conduit 18. The opening in casing 15 at the top of chute 17 is located above the level of liquid in casing 15 and silo 13 so that the solid material is allowed to drain and only carries absorbed and entrapped liquid with it to the conduit 18.

The extracted press cake with whatever solvent is associated therewith is conveyed through the conduit 18 and deposited in one end of the drier 19. A series of driers may be employed or in some cases it may be found that a single drier will be suitable. We prefer to pass the solid residual material successively through the driers 19, 20 and 21 to vaporize any solvent therein, discharging the solid residue from the last drier 21 through a rotary valve lock 22 to a discharge conveyor 23. The rotary valve 22 or other suitable means may be employed to reduce the escape of volatilized solvent from the driers.

The driers 19, 20, and 21 are preferably each provided on their exteriors with a heating jacket and may be arranged in any convenient manner in series with each other. Worm or screw conveyors may be employed in the driers to move the solids through the driers so that it may drop into the next drier or the valve 22. Thus, the screw conveyors in the three driers 19, 20, and 21 may be all driven from a counter shaft 24 through the chains 25, 26, and 27. Counter shaft 24 may be driven from any suitable source of power (not shown). These chains rotate the shafts 28, 29, and 30 which extend through stuffing boxes into the driers 19, 20, and 21. Suitable screw conveyors are preferably associated with the shafts 28, 29, and 30 inside the driers. The screw conveyors in the driers are preferably hollow and heated internally by means of steam or the like. Steam may be conveniently introduced by making shafts 28, 29 and 30 hollow and introducing the steam through the ends thereof to the interior of the hollow blades of the screw conveyor. The screw conveyors in driers 19 and 20 may be constructed like the left end of the screw in drier 21 illustrated in Fig. 4. In the last drier, provision is preferably made for introducing superheated steam directly into the solid material to ensure as complete removal of the solvent from the solid material as possible.

Figure 4:
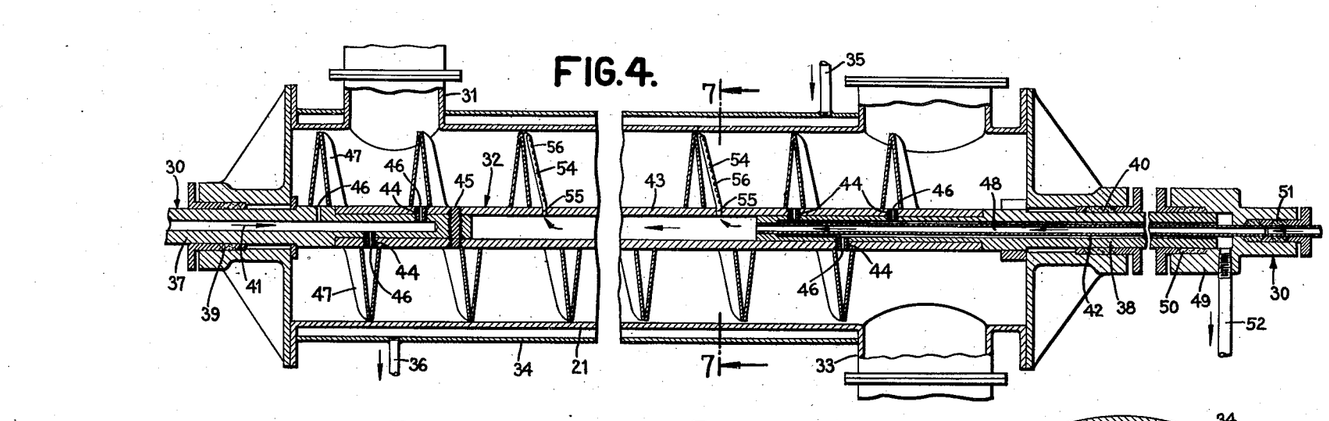
Figure 4 is a vertical section of the final drier, shown in Fig. 1b.
Figures 5, 6:
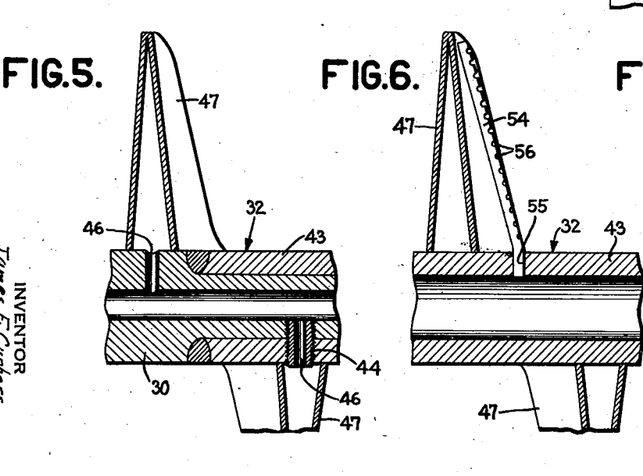
Figure 5 is a detailed vertical section of a blade at one end of the worm conveyor shown in Fig. 4.
Figure 6 is a vertical section of a blade in the central portion of the worm conveyor shown in Fig. 4.
Figure 7:
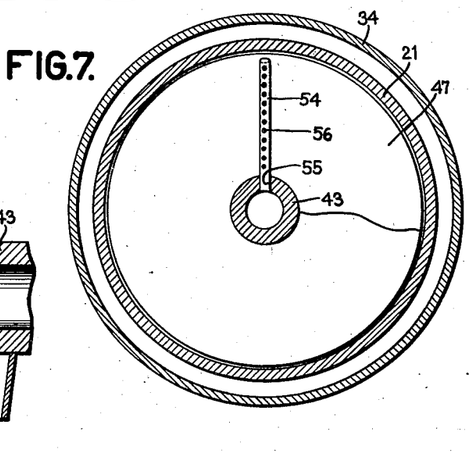
Figure 7 is a vertical cross section of the drier taken on the line 7—7 of Fig. 4.

With reference to Figs. 4 to 7, inclusive, illustrating drier 21, the solid material from driers 19 and 20 drops by gravity through the passageway 31 into one end of drier 21 where it is moved continuously to the right, as seen in Fig. 4, by the screw conveyor 32, finally dropping through the conduit 33 to the rotary discharge valve 22. Drier 21 is preferably provided with an external hollow jacket 34 into which steam may be admitted through the pipe 35 and discharged together with any condensate through the pipe 36.

The shaft 30 is preferably a composite of two end sections 37 and 38 which extend into the interior of the drier through packing glands 39 and 40, respectively. The end sections 37 and 38 of shaft 30 may be provided with central openings 41 and 42 and are fixed to the central tubular shaft section 43 by means of the hollow pins 44. The driving shaft section 37 is preferably also connected to the central shaft section 43 by an additional threaded solid pin 45. The opening 41 in shaft section 37 preferably does not extend all the way through the shaft and steam may be introduced through the opening 41 and thence through the radial openings 46 in the hollow pins 44 and in the shaft to the interior of the hollow blades 47 of the screw conveyor 32. The other end section 38 of shaft 30 is provided with a separate central tube 48 extending from the end of the shaft 30 into the interior of the central tubular shaft section 43. The inner end of tube 48 fits tightly with the inner end of shaft section 38, thus closing the space 42 between tube 48 and the inner wall of shaft section 38 in a manner similar to the other end of the shaft. At this end of the conveyor also, several of the hollow blades 47 are in communication with the space 42 by means of the openings 46, either in the pins 44 or in shaft section 38.

At the end of shaft section 38 outside of drier 21 a collar 49 may be provided, one end of which fits tightly over the exterior of shaft section 38 so that the shaft section is free to rotate in the packing gland 50.

The other end of collar 49 fits tightly over the exterior of tube 48 which is allowed to rotate therein by means of the packing gland 51. Steam or other heating medium may thus be withdrawn through the pipe 52 from the interior of the collar 49 in communication with the space 42. At the same time, steam or some other heating medium may be separately introduced into the interior of central shaft section 43 through the tube 48.

We prefer to introduce steam through the passageway 41 in the end shaft section 37 and withdraw steam and/or condensate through the pipe 52, thus obtaining a circulation of heating medium through all of the hollow blades 47 of the screw conveyor 32. At the same time, superheated steam may be introduced through the pipe 48 to the interior of the central tubular shaft section 43. The central blades of the conveyor are preferably provided with a number of tubular members 54, extending radially outward from the shaft section 43 and lying against the blades 47. The highly heated steam or other medium in the interior of shaft section 43 passes out through these tubular members 54 by means of the openings 55 in shaft 43 and is discharged directly into the mass of solid material in the drier through a number of small openings 56 in the tubes 54.

By heating the exterior of the driers and the interior of the conveyor, an effective action of the superheated steam in driving off any remaining solvent is obtained. Steam and solvent vapors leave the drier 21 through the passageway 31 to be condensed and separated.

With reference to Figs. 1a–1d, inclusive, the solvent may be stored for use in a suitable main solvent tank 60. The particular solvent used will, of course, depend on the material to be extracted but in general should be capable of selectively dissolving the extractable fat or oil and be easily recoverable from the dissolved fat or oil after extraction. For this reason, we prefer to employ a solvent having a low boiling point, such that it may be easily separated from the fat and water by vaporization of the solvent. The boiling point of the solvent should be high enough, however, to remain liquid during the extracting. Dichlor-methane is a satisfactory solvent meeting these requirements.

If desired, a reserve storage tank 61 may be provided above the tank 60 and having its lower portion connected to the top of the tank 60, as by the pipe line 62. Solvent may be introduced into the system as needed through the funnel 63 at the top of reserve tank 61. Except when solvent is being introduced, the valve 64 should be maintained closed.

Solvent for extraction is pumped from the lower portion of the main tank 60 by means of pump 65 through a suitable flow-meter 66 and the line 67 to the upper portion of the ascending side of the conveyor casing 15. The inlet for solvent in casing 15 is preferably above the liquid level of solvent in casing 15 and silo 13 indicated by the line AB, but below the top of chute 17. Fresh solvent is thus poured over the solid matter just before the solids are transferred to the driers. The extract, that is, the solvent with the fat or oil dissolved therein is withdrawn from the top of the silo 13 by the pump 68 through the line 69 and is passed to a suitable filter 70. The removal of any solids from the solution of oil in solvent by filtering may be omitted but superior operation is obtained if filtering is carried out before further treatment of the liquid.

The introduction of the solvent into the casing 15 and the withdrawal of the oil dissolved in the solvent from the top of the silo 13 provide a continuous flow of liquid down through casing 15 and up through conduit 14 and silo 13 counter current to the continuous movement of the solid material being treated. By maintaining the liquid level in this extracting tower above the connection of the conduit 12 to the top of silo 13, a liquid seal is provided for the introduction of the original solid material without substantial loss of solvent and without splashing.

After passing through the filter 70, or without filtering if desired, the liquid extract may be passed through the line 71 to a preheater 72. By-passes 73 and 74 may be provided if desired so that the filter 70 and/or the pump 68 may be disconnected without loss of liquid after first opening the valves in the by-pass lines and closing the valves on each side of the pump 68 and/or filter 70. The auxiliary line 75 may be provided so that solvent can be pumped from the casing 15 if this should be desirable although ordinarily, the valve in this line 75 will remain closed.

The preheater 72 may comprise a jacket into which a heating medium such as steam is admitted through a pipe 76, the condensate being discharged at 77. The temperature to which liquid in this chamber 72 is heated, is preferably controlled automatically by a valve 78a operated by a thermostatic device 78 which controls the admission of steam into chamber 72 in response to the temperature of the liquid emerging from the chamber. The extract from the line 71 may be circulated through a coil 79 within the heating chamber. The temperature is preferably maintained high enough to heat the extract to a temperature above the boiling point of the solvent contained therein. The heated extract from the coil 79 then flows through the pipe line 80 to a flashing column 81, the heated liquid being under pressure until it reaches the flashing column 81; consequently, the solvent is not allowed to vaporize before this point in the system. The heated liquid is introduced into the flashing column 81 near the top thereof and most of the solvent immediately vaporizes, the vapor passing from the top of the column 81 through the line 82 to the condenser 83. Condenser 83 may be cooled in any desirable manner by a circulation of water or other suitable cooling medium introduced at 84 and withdrawn at 85. Condensed solvent flows from the bottom of condenser 83 through the line 86 and flow-meter 87 to the storage tank 60 for re-use.

The oil remaining in the flashing column 81 will probably not be entirely free of solvent and if solvent is still contained therein, the oil and residual solvent may be pumped by the pump 88 through the line 89 to the finishing still 90. Finishing still 90 (Figs. 1c and 2) preferably comprises an outer shell and an inner heating dome 91. Dome 91 is preferably closed and heated internally by the introduction of a heating medium such as steam through the pipe 92 and the withdrawal of condensate and/or steam through the outlet 93. The oil containing some solvent is introduced and directed in a stream into a dish-shaped receiver 94 on the top of dome 91 by the pipe 95. As the oil containing some solvent overflows the sides of receiver 94 and runs down the exterior of dome 91, any residual solvent becomes vaporized. The liquid oil collects in the bottom of the still 90 around the dome 91 and superheated steam may be injected directly up through the gathered oil pool to drive off the last of the solvent. This superheated steam may be injected through a plurality of nozzles 96 connected to steam pipe 97. The amount of oil in the still 90 at any time can be easily determined from the gauge glass 98.

Solvent-free oil may be withdrawn continuously, or as needed, from the lower portion of the still 90 through the line 99 by the pump 100. The oil, or cocoa butter in the preferred operation of our invention, is discharged through the line 101 to storage or to some further processing or packaging treatment as may be expedient.

The vapors discharged from the finishing still 90 comprise a mixture of solvent and water vapors which is conducted from the top of still 90 to a primary condenser 106 through the line 107. This primary condenser may be cooled by a continuous circulation of water admitted through the inlet 108 and discharged by the outlet 109.

Figures 1A, 2:
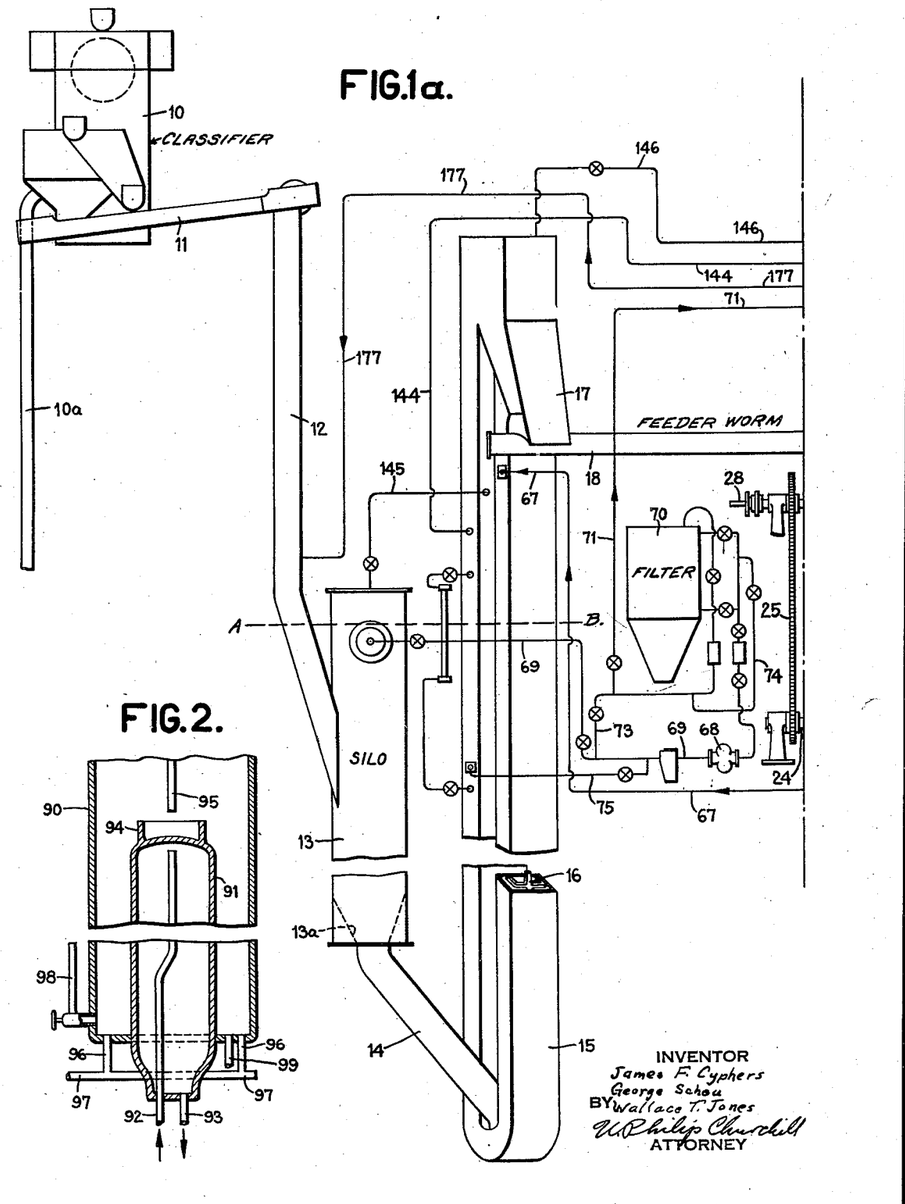
Figures 1a, 1b, 1c, and 1d together represent a complete flow sheet of the process and apparatus for carrying out the solvent extraction process of our invention.
Figure 2 is a vertical cross section of a finishing still used to separate the last of the solvent from the extracted fat or oil for recovery.
Figures 1B, 3:
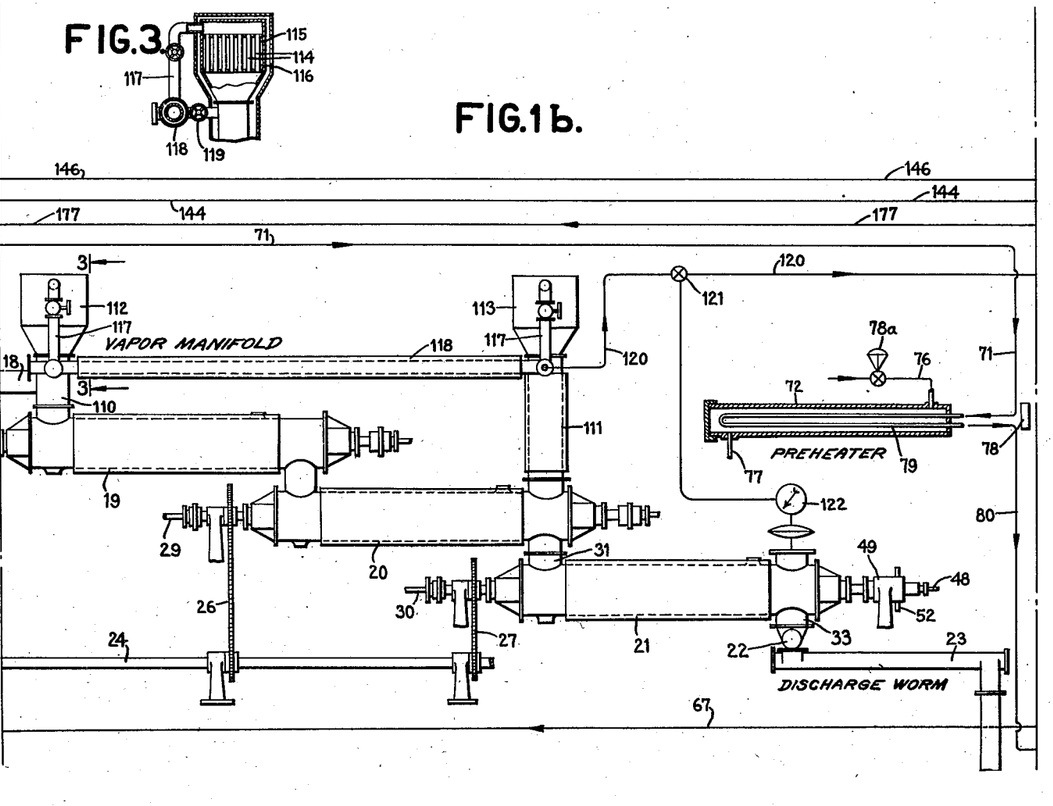
Figure 3 is a vertical section of a vapor filter taken on the lines 3—3 of Fig. 1b.
Figure 1C:
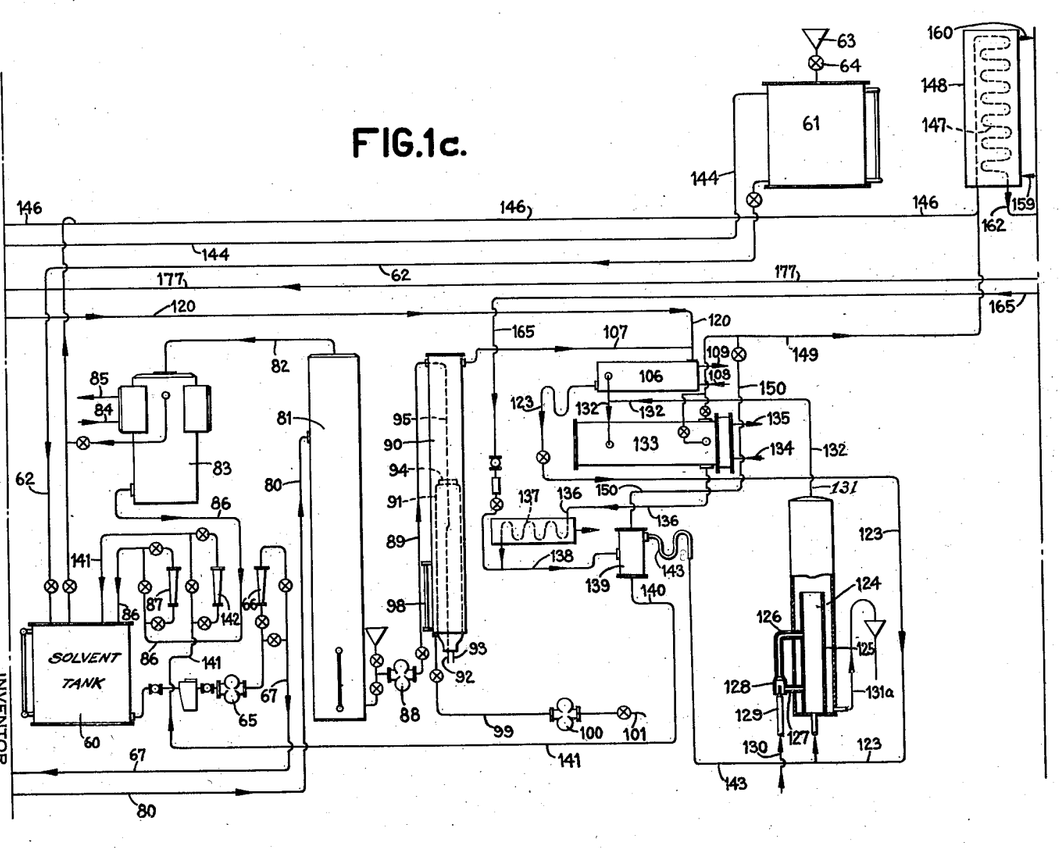
Figure 1D:
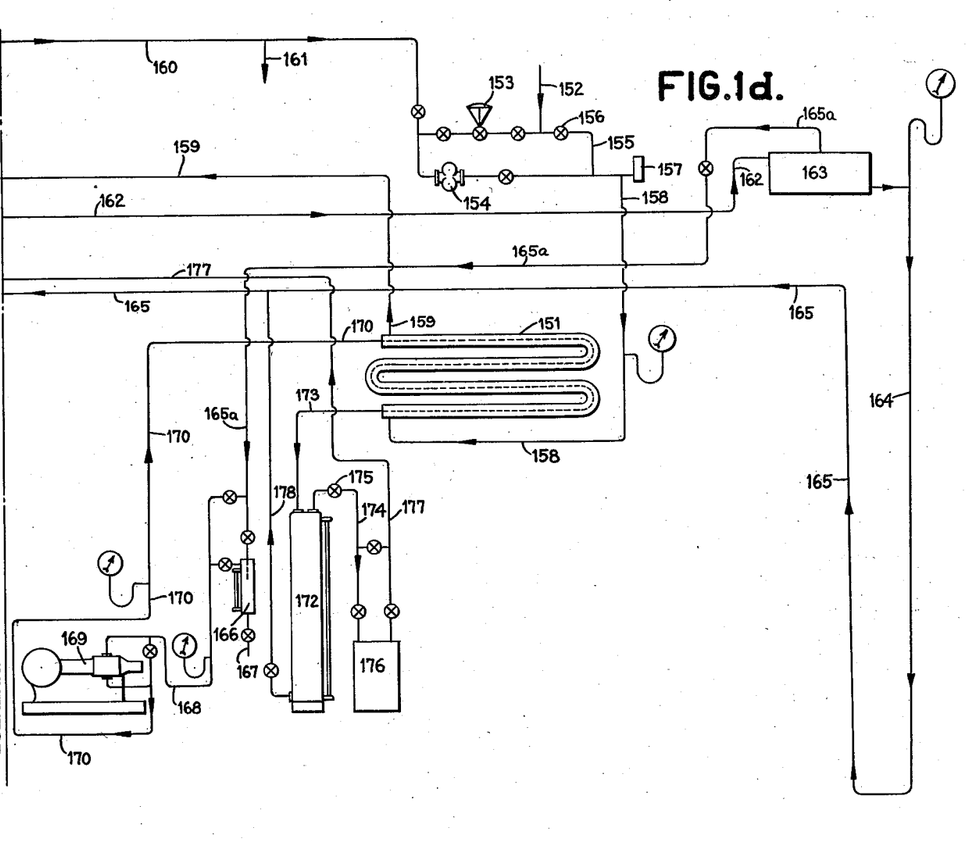

Returning now to the disposition of the vapors from driers 19, 20, and 21, the vapors, including solvent vapor expelled by heat from the residual solid cellular material, water vapor from the introduction of superheated steam into the system through the tubes 54 on the screw conveyor in drier 21, and some air which leaks in around the rotary discharge valve 22, pass up through the headers 110 and 111 and through the filters 112 and 113 to remove any dust or other solid matter. The filters are preferably alike in construction, one of which is illustrated in Fig. 3. The vapors pass up through tubes 114 which may contain some filtering material such as asbestos cloth and which are heated by steam introduced at 115 and withdrawn at 116. The filtered mixture of gases passes over from the filters through conduits 117 to a vapor manifold 118. The vapor manifold 118 and the filters 112 and 113 are preferably steam jacketed to avoid any condensation of solvent or water vapor. This is particularly desirable for preventing corrosion of the apparatus, although with non-corrosive solvents this may not be necessary. By-passes 119 from the lower portion of the filters 112 and 113 directly to the manifold may be provided if desired.

The mixture of gases may be conducted through the line 120 to the primary condenser 106, where the gases are mixed with the solvent and water vapors from the still 90 introduced into the condenser 106 through the line 107.

In order to prevent the escape of solvent vapors through the rotary discharge valve 22 for solid material and through any other opening in the system, we prefer to maintain the pressure within the driers, filters, and vapor manifold at some pressure just below atmospheric pressure. Too great a partial vacuum would be undesirable because excessive amounts of air would be introduced into the system. The vapor-handling portion of the system, however, is connected to the suction side of a compressor to be described and it is therefore desirable to modify the suction effect of this compressor on this portion of the system. In order to control the amount of vacuum near the driers and particularly adjacent the rotary discharge valve 22, a valve 121 is placed in the vapor line 120 between the driers and the compressor. A control device 122 may be located just above the rotary valve 22 at the outlet end of drier 21, and this pressure controller 122 preferably automatically operates the valve 121 to maintain the desired pressure in this portion of the system. We have found that it is more economical to allow small quantities of air to flow in through the valve 22 and subsequently eliminate this non-condensable gas from the system, than to maintain the system under atmospheric pressure or a slight super-atmospheric pressure with a consequent loss of solvent vapor. A vacuum of about ½ to 3 inches of water and preferably about ½ to 1 inch of water has been found to be suitable for this purpose.

The majority of the steam is condensed in the primary condenser 106 and the water containing a small amount of dissolved solvent is withdrawn from the lower portion of condenser 106 and passed through the line 123 to the interior of the heating chamber 124. The central portion of the heating chamber 124 is provided with a vertical casing 125 concentric with the outer shell, and branch pipes 126 and 127 are connected to this inner casing 125 at points one above the other. These branch pipes are joined together outside the casing at the receiver 128. Injector nozzle 129 directs a jet of steam from the line 130 into the receiver 128, thereby inducing a circulation and heating of the liquid inside the casing 125. Liquid in the lower portion of casing 125 is thus drawn through the pipe 127 to receiver 129 and is returned heated by steam from nozzle 129 to the casing through pipe 126. This arrangement provides a continuous circulation and mingles liquid from line 123 immediately with heated water to vaporize any remaining solvent dissolved in the water.

During this heating treatment, the temperature of the circulating water is preferably maintained just below its boiling point, for example, at a temperature of around 190° F. to minimize vaporization of the water. The water which overflows the top of the casing 125 is substantially free of solvent and may be withdrawn from chamber 124 through the line 131a and discarded.

Solvent vapors are returned from the top of the heating chamber 124 through the line 131 to the line 132 connecting an upper portion of primary condenser 106 to the secondary condenser 133. The vapors from condenser 106, comprising chiefly solvent vapors, are withdrawn from about the middle or upper portion of the primary condenser 106 through the line 132 to the secondary condenser 133. Condenser 133 may be cooled by a cold water circulation, water being introduced at 134 and withdrawn at 135. Condensate from the secondary condenser 133 may be passed through the line 136 to an additional cooling coil 137, if desired, and thence through the line 138 to a condensate receiver 139 where any water and liquid solvent are allowed to separate in layers. The liquid solvent contains a slight amount of dissolved water which is not sufficient with the solvent we prefer to use to interfere with its extracting properties. Consequently the solvent layer is returned from the receiver 139 through the lines 140 and 141 to the solvent storage tank 60. This solvent may be passed through a flow-meter 142, if desired. The apparatus illustrated in the drawings is intended for use with a solvent which is heavier than water and accordingly the solvent layer is withdrawn from the bottom of receiver 139. If a solvent should be employed which is lighter than water in the liquid state, the solvent layer will, of course, be withdrawn from an upper portion of receiver 139. Water separated in the receiver 139 may be transferred through the line 143 to the lower portion of casing 125 in heating chamber 124, where it becomes mingled with the water from primary receiver 106 heated and freed of any solvent dissolved therein.

The system can be operated as described above by simply discharging air trapped in the enclosed system at various points directly into the atmosphere. However, the escape of such air would carry with it solvent vapor which may be very desirable to conserve. Accordingly, we prefer to vent all portions of the apparatus to a common receiver and further extract the solvent contained in the air before allowing the air to escape from the system.

In order to allow solvent to flow freely from the reserve solvent storage tank 61 to the main solvent tank 60, we prefer to connect the upper portion of the reserve solvent tank 61 to the casing 15 surrounding the conveyor 16 at a point above the liquid level therein by means of the line 144. The top portion of the silo 13 may also be vented to the casing 15 by the vent line 145. The uppermost portion of the casing 15 is connected by line 146 to the coil 147 in the brine tank 148. The main line 146 leading to coil 147 may also be connected to the top of condenser 133 as well as to the top of the liquid separator 139 by the pipes 149 and 150.

The brine used for cooling may advantageously be circulated through the brine tank 148 and also through the brine coil 151 for a purpose described below by a piping system connected in series. For example, the brine may be obtained from a main cooling system (not shown) through the line 152, passing through the thermostatically controlled valve 153 to the circulating pump 154. By-pass 155 with valve 156 may be provided as an alternative manual control, if desired. From the pump 154, the brine passes a thermostat 157 which serves to control valve 153 and thence travels through line 158 to the cooling coil 151 and from there through the line 159 to the brine tank 148. From the top of the brine tank, brine is returned through the line 160 to the pump 154, or to the main cooling system through the line 161 in accordance with the regulation of the addition of fresh cold brine by the automatically controlled valve 153.

Condensate from the brine cooled coil 147 is transmitted through the line 162 to a receiver 163 where any condensed liquid, after passing through the trap 164 to separate liquid from gas, is returned through the line 165 to the line 138 leading to the receiver and liquid separator 139. This condensate from receiver 163 is thus mingled with the condensate from the cooling coil 137 and the water and liquid solvent are separated and treated as previously described.

The uncondensed gases from receiver 163 still contain some solvent and are preferably conducted through the line 165a to a further receiver or trap 166. Any liquid which condenses during this passage will be water and/or solvent and drains into this trap 166 from which it may be withdrawn from time to time through the normally closed drain pipe 167. The gases from the receiver 166 are transferred to a compressor 169 through the line 168 and the compressed gases from compressor 169 are carried through line 170 to the cooling coil 151 where these compressed gases are cooled by the brine solution. The cooled compressed gases from the coil 151 containing condensate is then conducted to the receiver 172 through the line 173. The compressed gas in receiver 172 will consist almost entirely of air which may be discharged from the system through the line 174 controlled by the valve 175. This gas may be metered at 176, if desired, and is preferably discharged into the gravity feed chute 12 by the line 177. The dry solids to be extracted will thus absorb any solvent vapors in the gas before the gas reaches the atmosphere. Alternatively, however, this gas may be discharged directly to the atmosphere. Condensate from receiver 172, which comprises largely solvent with a trace of water therein, is returned through main line 178 to the line 165 and thence to the separator 139 with the liquid from the bottom of condenser 133.

In general, the recovery of solvent from the system is operated as follows. The solvent containing the dissolved oil from the continuous counterflow extraction treatment in silo 13 and conveyor casing 15 is preheated under pressure to a temperature a few degrees above the boiling point of the solvent without allowing it to vaporize. When cocoa butter is being extracted, using a solvent such as dichlormethane, this heating may be to a temperature of about 140° F. The preheated solvent and cocoa butter are then run into a chamber where the solvent is allowed to suddenly vaporize by a sudden release of the pressure from the liquid. Most of the solvent is thus vaporized and the vaporized solvent is condensed and returned to storage.

The cocoa butter remains liquid and is then treated with superheated steam to drive off the last of the solvent therefrom. The solvent-free oil or cocoa butter is then withdrawn from the system. The vapors from this treatment contain both solvent vapor and water vapor and are condensed. During this time, the residual cocoa solids are being dried by injection of superheated steam and the vapors from this treatment are condensed with the vapors from the treatment of the oil. This condensate thus comprises a mixture of liquid solvent and water and is separated in layers for separate treatment. The solvent layer is returned to storage and the water layer is mingled with a body of water heated to about 190° F. which vaporizes all but an insignificant amount of the solvent. The water thus substantially free of solvent is withdrawn and discarded while the solvent vapors are returned for recondensation with the vapors from the oil treatment and from the driers.

Such a recovery process might be operated without allowing air to become introduced into the system, or by trapping and discharging any air directly to the atmosphere. Such an operation would result in large losses of solvent vapor, in practical operation however, and it is preferred therefore, to maintain the system at the outlet for the treated solid material, where solvent losses tend to be highest, under a slight subatmospheric pressure. Substantial quantities of air are thus introduced into the system but solvent vapor loss is effectively curbed. The upper portion of the apparatus is then preferably vented and the gases thus collected, containing material amounts of uncondensible air, are cooled, compressed, and further cooled to remove as much of the condensible gases therefrom as possible. The condensate from this treatment is then returned for treatment with the other condensates to recover any solvent therein and the uncondensed gas is discharged from the system.

While this uncondensed gas may be discharged directly to the atmosphere, it is preferably discharged into the fresh solid material, that is into the lower portion of the feed tube 12 above the liquid level whereby any further remaining solvent vapor will be absorbed by the dry solid material and the remaining gases will escape through the tube 11.

Various by-passes may be employed in the system wherever it may be desirable to repair or replace various instruments or parts of apparatus without stopping the operation of the process.

While our process and apparatus are particularly useful for extracting cocoa butter from various cocoa materials such as "press cake" or "expeller cake" using dichlor methane as a solvent, it will be apparent that other oily or fatty materials may be similarly extracted from solids containing such fatty material in an extractable form. Other solvents may, of course, be employed. This invention is well adapted in general for extracting oils or fats from ground oil bearing seeds or nuts. By the terms "oil" and "fatty material" used in the appended claims, we intend to include any fat or oil which may be continuously extracted by this invention.

The terms and expressions which we have employed are used as terms of description and not of limitation, and we have no intention, in the use of such terms and expressions, of excluding any equivalents of the features shown and described or portions thereof, but recognize that various modifications are possible within the scope of the invention claimed.

We claim:

A closed system for extracting fatty material from solids with a volatile solvent and recovering and re-using said solvent comprising means for injecting steam into the system to vaporize solvent to be recovered, means for collecting and condensing the solvent vapors and steam, means for separating the liquids thus condensed, and means for treating the separated water including a container within the system having an inlet for the separated water in a lower portion thereof, means for heating and circulating the water in said container, and means for discharging from the system water overflowing from said container.

JAMES F. CYPHERS.
GEORGE SCHEU.
WALLACE T. JONES.